S. LEE.
TWINE HOLDER.
APPLICATION FILED FEB. 19, 1921.
1,405,526.
Patented Feb. 7, 1922.
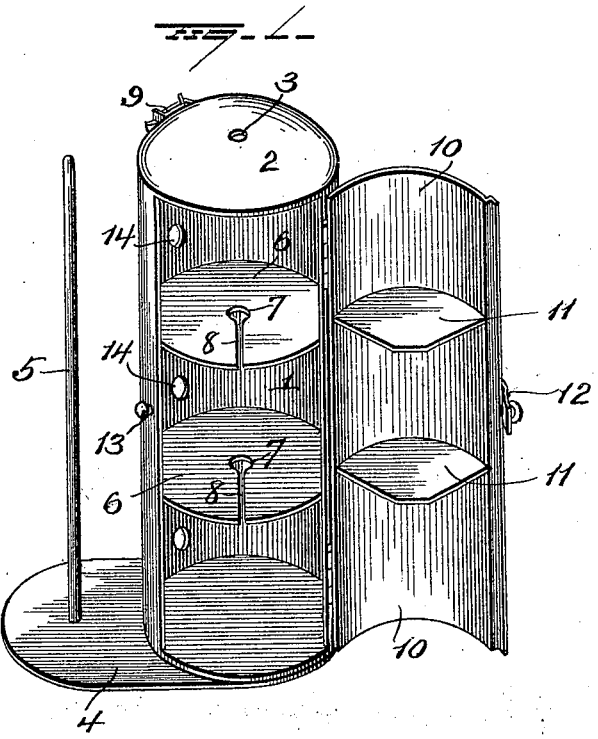
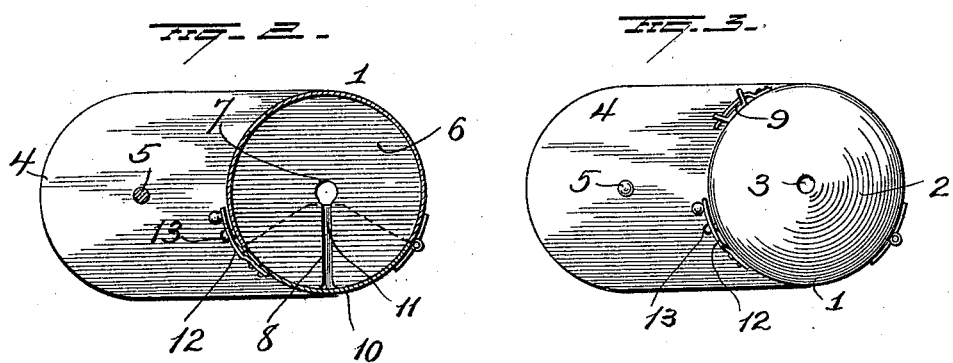
Inventor
S. Lee
By Seymour & Bright
Attorneys

UNITED STATES PATENT OFFICE.

SIDNEY LEE, OF BROKEN ARROW, OKLAHOMA.

TWINE HOLDER.

1,405,526.  Specification of Letters Patent.  Patented Feb. 7, 1922.

Application filed February 19, 1921. Serial No. 446,493.

*To all whom it may concern:*

Be it known that I, SIDNEY LEE, a citizen of the United States, and a resident of Broken Arrow, in the county of Tulsa and State of Oklahoma, have invented certain new and useful Improvements in Twine Holders; and I do hereby declare the following to be a full, clear, and exact description of the invention, such as will enable others skilled in the art to which it appertains to make and use the same.

This invention relates to improvements in twine holders and more particularly to such as are employed on corn and grain binders,— one object of the invention being to provide a simple and efficient twine holder having a plurality of compartments to receive balls of twine; to prevent possibility of binding or breaking of the twine as the same is threaded through one or more of the dividing partitions forming said compartments; to provide means whereby ready access may be had to the interior of the device and which when opened will expose all of said compartments; to so construct said device that it may be tightly closed and serve effectually to protect the twine contained therein from the effects of moisture, and to provide means for supporting a reserve supply of balls of twine.

With this and other objects in view, the invention consists in certain novel features of construction and combinations of parts as hereinafter set forth and pointed out in the claims.

In the accompanying drawings, Figure 1 is a view of my improved twine holder with the door open. Figure 2 is a transverse sectional view, and Figure 3 is a plan view.

My improved twine holder comprises a metal container, 1, preferably made cylindrical in form and the top 2 of said container is made convex so as to shed water and prevent the same from entering the central hole 3 through which the twine passes. At the bottom of the container a lateral plate or arm 4 is provided and from this plate or arm, a post 5 projects upwardly to receive and support a reserve supply of balls of twine.

The interior of the container is divided into a plurality of compartments separated by partitions or platforms 6 each having a central hole 7 for the passage of twine and each provided with a slot 8 extending from the central hole to the periphery of the partition or platform to facilitate the introduction of the twine. The balls of twine are disposed in the several compartments,—the twine from the balls in the compartments being passed upwardly through the superimposed partitions or platforms and out through the central hole 3 in the top of the container and, after passing through a suitable tension device 9 on the container, is carried to the binding mechanism. The inner end of the ball of twine in the bottom compartment will be tied to the outer end of the ball of twine in the next compartment above and when a greater number of compartments are employed the balls of twine will be tied together in the same manner so that the twine will be unwound successively from the several balls.

The container is provided with a curved door 10 hinged at one edge thereto and this door is provided with horizontal plates or projections 11 which are so disposed that when the door is closed, they will move under the partitions or platforms and serve in effect to close the elongated slots therein and prevent the twine passing through said partitions or platforms from escaping from the central guide holes therein and becoming tangled or caught. The door is preferably made of sheet metal and the plates or projections serve, not only to perform the function above described, but also to strengthen the door. The free edge of the door may be made to overlie one edge of the body of the container so as to effect a tight joint and said door will be provided with a latch 12. This latch may be made of spring steel and secured to the door in such manner that it will project an appreciable distance from its free edge so that it may engage a button 13 on the body of the container,—said latch being provided near its free end with a suitable opening to receive said button and engage the shank thereof. The door when closed and latched will effectually close the container against the entrance of water and dust.

When the door is open, access may be had to all the compartments so that if the twine in the upper compartments shall have become exhausted, the ball in the lower compartment may be transferred to the upper compartment and fresh balls from the reserve supply placed in the lower compartments. The container may be provided with peep-holes 14 to permit the operator to view the several compartments without opening the door.

Having fully described my invention what I claim as new and desire to secure by Letters-Patent, is:

1. In a twine holder, the combination of a container having a hole in its top for the passage of twine, a platform or partition in said container dividing the latter into compartments, said platform having a central hole for the passage of twine and having a slot extending from said central hole to the periphery of the platform or partition, a hinged door, and means movable by said door and operating to close said slot and prevent escape of the twine from the central hole in the partition or platform when the door is closed and to open said slot when the door is opened.

2. In a twine holder, the combination of a sheet metal container having a convex top provided with a central hole for the passage of twine, a partition or platform in said container and dividing the latter into compartments, said partition or platform having a central twine hole and an elongated slot extending from said hole to the periphery of said partition or platform, a curved sheet metal door hinged at one edge to the body of said container, and a plate secured to the inner side of said door and adapted to become disposed under said partition or platform and close the slot in the latter when the door is closed.

3. In a twine holder, the combination of a container, a plurality of platforms therein, each having a central hole and an elongated slot extending from said hole to the periphery of the platform, a hinged door for said container, a plurality of plates carried by said door and projecting inwardly from the inner face thereof, said plates being arranged to become disposed under said platforms and close the slots in the latter when the door is closed, and a latch device for holding the door in closed position.

In testimony whereof, I have signed this specification in the presence of two subscribing witnesses.

SIDNEY LEE.

Witnesses:
 F. S. HURD,
 JOSEPH C. DOWDY.